May 24, 1938.  W. H. DOONAN  2,118,462
BASIN LISTER DAMMING MACHINE
Filed May 22, 1937  3 Sheets-Sheet 1
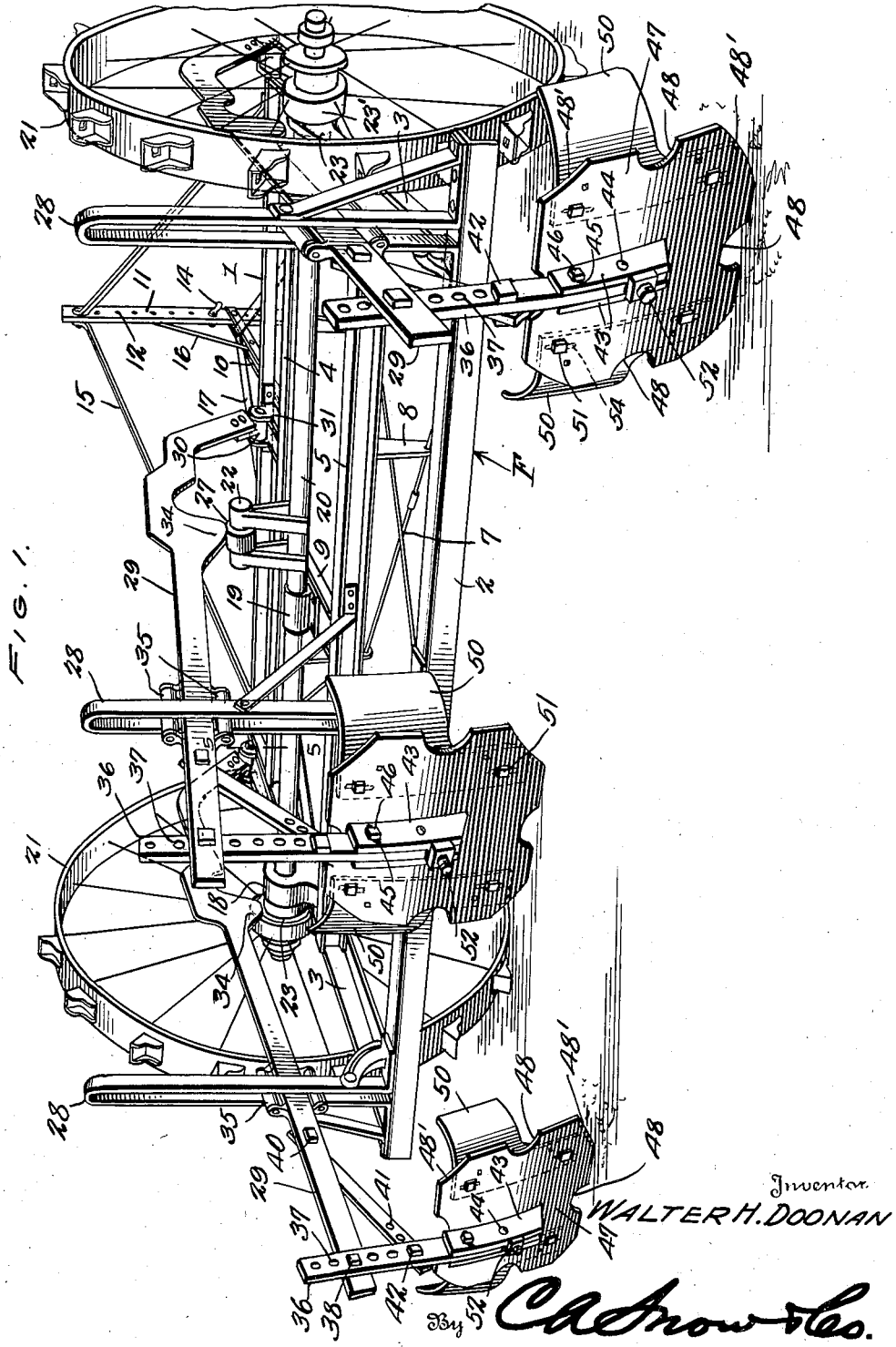

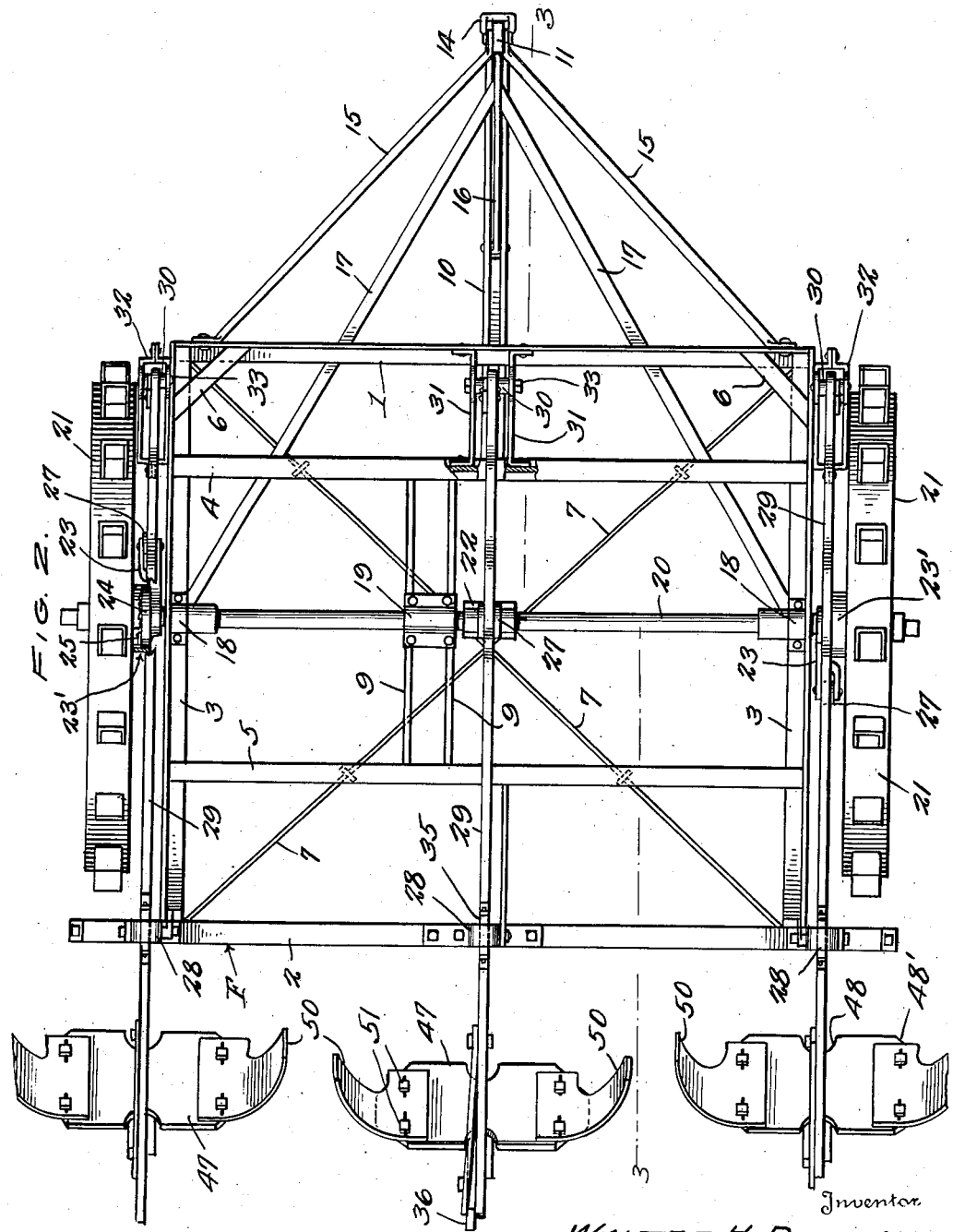

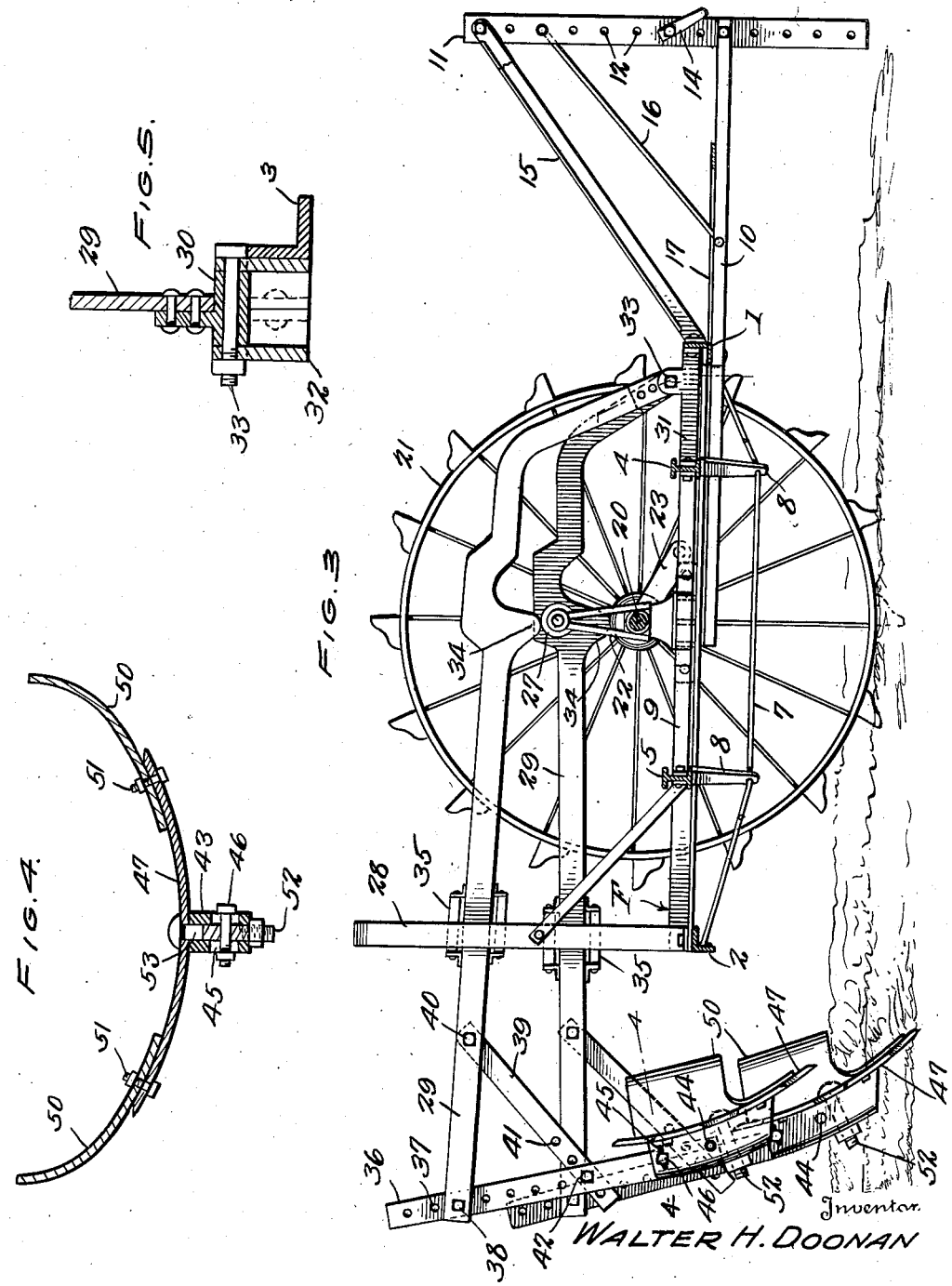

Patented May 24, 1938

2,118,462

UNITED STATES PATENT OFFICE 2,118,462

BASIN LISTER DAMMING MACHINE

Walter H. Doonan, Great Bend, Kans.

Application May 22, 1937, Serial No. 144,281

4 Claims. (Cl. 97—55)

The device forming the subject matter of this application is adapted to be used to promote basin listing, a form of soil tillage calculated to control erosion by water and wind. The land is listed in the usual way, to form furrows. If sufficient tractor power is available, at the same time, by means of a device drawn by the tractor and operated at the same time as the lister, dams are thrown across the furrows at regular intervals of about ten to thirteen feet, the water thus being held and being forced to soak into the ground.

The present invention aims to provide a machine for creating the dams in the furrows, by a separate operation, the machine being complete in itself and being capable of operating as a unit, since many farmers do not have tractors of sufficient power to pull a lister in which a damming attachment is embodied. In the present invention, the machine can be used as a separate unit after the tractor has drawn the lister over the ground.

The invention aims to provide novel means for raising and lowering the soil-engaging elements, so that dams will be formed at intervals. A further object of the invention is to improve the soil-engaging elements, so that they may be turned to new positions after they have become dulled or otherwise imperfectly operative. A further object of the invention is to supply novel means for actuating and controlling the movement of the levers which carry the soil-engaging elements.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in perspective, a machine constructed in accordance with the invention, parts being broken away;

Fig. 2 is a top plan;

Fig. 3 is a longitudinal section on the line 3—3 of Fig. 2;

Fig. 4 is a section on the line 4—4 of Fig. 3;

Fig. 5 is a section on the line 5—5 of Fig. 1.

In carrying out the invention, there is provided a frame which is denoted as a whole by the letter F. The frame may be variously constructed, and the structure shown in the drawings and hereinafter described is not insisted upon as essential. The frame F is rectangular in top plan, as Fig. 2 will show, and it comprises a front bar 1, a rear bar 2 and side bars 3, the ends of the rear bar 2 projecting outwardly beyond the side bars 3. The side bars 3 of the frame F are connected by parallel intermediate beams 4 and 5, which may be I-beams. Braces 6, shown in Fig. 2, connect the front bar 1 with the side bars 3. Crossed truss rods 7 are connected at their ends to the corners of the frame F, and cooperate, intermediate their ends, with struts 8, depending from the intermediate beams 4 and 5. Parallel supports 9 connect the front intermediate beam 4 with the rear intermediate beam 5, and are located a little to one side of the longitudinal center of the machine, as Fig. 2 will show. The forward intermediate beam 4 is connected to the front bar 1 of the frame F by parallel brackets 31.

The rear end of an I-beam tongue 10 is secured to the front bar 1 of the frame F and carries, at its forward end, a vertical hitch piece 11, having openings 12 for the adjustable reception of a clevis 14. Downwardly inclined and rearwardly diverging braces 15 connect the upper end of the hitch piece 11 with the front bar 1 of the frame F. A downwardly and rearwardly inclined brace 16 connects the upper part of the hitch piece 11 with the tongue 10. Horizontal, rearwardly diverging braces 17 connect the tongue 10 with the side bars 3 of the frame F, at points intermediate the ends of the side bars.

Mounted on the side bars 3 of the frame F are bearings 18, an intermediate bearing 19 being secured to the supports 9. An axle 20 is journaled for rotation in the bearings 19 and 18, and ground wheels 21, located outwardly of the side bars 3 of the frame F are journaled on the axle, although in the practical operation of the machine, the axle 20 is rotated by the ground wheels 21 through an instrumentality which will be described hereinafter.

An intermediate arm 22 is secured to the axle 20, at a point between its ends, side arms 23 being secured to the axle, outwardly of the members 3 of the frame F. Each of the side arms 23 comprises a disk 24, the disks being received in the hubs 23' of the ground wheels 21. The ground wheels 21 are connected to the disks 24 by pawl and ratchet mechanisms 25 indicated in Fig. 2, the construction being such that when the ground wheels 21 are rotated forwardly, the axle 20 will be rotated: although the ground wheels may rotate rearwardly without turning the axle in the bearings 18 and 19. Rollers 27 are journaled on the ends of the arms 22 and 23, as can be seen best in Fig. 1 of the drawings. Loop-shaped, braced guides 28 are provided. Two of these guides are mounted on the rear bar 2, outwardly of the side bars 3, the third guide being mounted on the rear bar 2 intermediate the ends thereof.

Vertically movable L-shaped levers 29 are provided. To the forward ends of the levers 29, tubular bearings 30 are secured. The bearing 30 of the intermediate lever is received between the brackets 31, and the bearings of the side levers are received in loop-shaped brackets 32 secured to the outer sides of the bars 3 of the frame F. Pivot elements 33, extended through the bearings, support the levers for vertical swinging movement on the brackets 31 and 32.

The levers 29 extend upwardly from their front ends, and thence backwardly, as shown in Fig. 3. Intermediate their ends, the levers 29 have depending projections 34. The levers 29 have vertical movement in the guides 28 and are held by the guides against lateral swinging movement, the levers being supplied with rollers 35 which lessen the friction between the levers and the guides 28.

For each lever 29 there is provided a depending standard 36 which is supplied with longitudinally spaced openings 37, adapted to receive a securing element 38 which connects the standard 36 with the lever 29 for vertical adjustment. The upper ends of braces 39 are pivoted at 40 to the rear portions of the levers 29, and the rear ends of the braces have openings 41, adapted to receive securing devices 42 which may be mounted in any of the openings 37 of the standards 36 to vary the angle of the standards with respect to the vertical.

Two-part brackets 43 are pivoted intermediate their ends at 44 to the lower portions of the standards 36, the brackets being provided near to their upper ends with horizontally elongated slots 45 receiving securing elements 46 which hold the brackets in any position to which they may have been tilted on their pivotal mountings 44.

Soil-engaging elements are provided and each includes a central body 47, of approximately rectangular form, the body 47 having notches 48 in each of its edges, midway between the ends of those edges, and the corners of each body 47 being cut away, as shown at 48'. The body 47 has a rearward convexity, as Fig. 4 will show. Curved wings 50 are attached by securing devices 51 to the outer portions of the bodies 47 of the soil-engaging elements. The body 47 of each soil-engaging element is attached to the brackets 43 by a bolt 52 or the like, having a squared portion 53 received in a corresponding opening in the body 47 of the soil-engaging element.

As to general operation, it will be understood that when the ground wheels 21 are rotated forwardly, the pawl and ratchet mechanisms 25 will rotate the axle 20. The roller carrying arms 22 and 23, cooperating with the projections 34 on the levers 29, will raise the levers, together with the soil-engaging elements, the levers and the soil-engaging elements dropping by gravity. In this way dams will be thrown across the furrows at intervals.

The distance between the dams is controlled by the height of the ground wheels 21, one dam being thrown across each furrow at each complete rotation of the drive wheels. A uniform and minimum pull will operate the machine, since the construction is such that the arms 22 and 23 will raise the corresponding levers 29 one at a time.

The soil-engaging elements, including the parts 47 and 50, scrape the load of soil from the bottom and sides of the furrows, broadening and rounding the furrows throughout the distance which the soil-engaging element drags before dumping its load. The wings 50 extend over the shoulders of the ridges of the furrows and promotes uniformity in the shape of the furrows.

Owing to the shape of the body portions 47 of the soil-engaging elements, they may be rotated for adjustment on an axis represented by the bolt 52, and a new edge can be presented to the soil upon occasion. The desired amount of soil gathered by each dam is regulated by the slope given to each soil-engaging element, the slope being regulated by changing the position of the standard 36 with respect to the lever 29 and by changing the position of the brackets 43 with respect to the standard. It is to be observed that the securing elements 51 which secure the wings 50 to the bodies of the soil-engaging elements 47 work in elongated slots 54 in the parts 47 and, therefore, the wings 50 may be adjusted vertically. The height that the soil-engaging elements rise, to release the dirt, is controlled by fastening the clevis 14 in the openings 12 of the member 11. By this adjustment, dams of any desired height may be thrown across the furrows. Owing to the provision of the projections 34 on the levers 29, the ground wheels 21 need turn a small amount only to raise the soil-engaging elements and dump the load which they have accumulated.

Although the machine is shown in a three furrow form, it may be constructed to operate in any desired number of furrows.

Having thus described the invention, what is claimed is:

1. In a device of the class described, a frame, an axle journaled on the frame, ground wheels on the axle and constituting means for rotating the axle, levers having their forward portions fulcrumed on the frame, arms on the axle and constituting means for raising the levers, depending standards, soil-engaging members carried by the lower ends of the standards, and means for connecting each standard to the corresponding lever to vary the angle between the standard and the lever.

2. In a device of the class described, a frame, an axle journaled on the frame, ground wheels constituting means for rotating the axle, levers having their forward portions fulcrumed on the frame, means on the axle for raising the levers, standards carried by the rear portions of the levers, soil-engaging members, and means for connecting the soil-engaging members to the standards, each soil-engaging member comprising a rearwardly concaved body, and forwardly curved wings secured to opposite side portions of the body.

3. In a device of the class described, a frame, an axle journaled on the frame, ground wheels constituting means for rotating the axle, levers having their forward portions fulcrumed on the frame, means on the axle for raising the levers, standards carried by the rear portions of the levers, soil-engaging members, and means for connecting the soil-engaging members to the standards, the means for connecting the soil-engaging members to the standards embodying brackets, means for pivoting the brackets to the standards for swinging adjustment forwardly and backwardly, and means for connecting the soil-engaging members to the brackets.

4. In a device of the class described, a frame, an axle journaled on the frame, ground wheels constituting means for rotating the axle, levers having their forward portions fulcrumed on the frame, means on the axle for raising the levers, standards carried by the rear portions of the levers, soil-engaging members, and means for connecting the soil-engaging members to the standards, each soil-engaging member comprising an approximately rectangular body having its corners cutaway, the body being provided in each of its edges with notches, and wings secured to the outer portions of the bodies of the soil-engaging members.

WALTER H. DOONAN.